(12) United States Patent
Park

(10) Patent No.: US 8,531,764 B2
(45) Date of Patent: Sep. 10, 2013

(54) STEREOSCOPIC IMAGE DISPLAY DEVICE USING PATTERN RETARDER METHOD AND METHOD FOR FABRICATING THE SAME

(75) Inventor: Jaehyun Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 176 days.

(21) Appl. No.: 13/295,423

(22) Filed: Nov. 14, 2011

(65) Prior Publication Data

US 2012/0326590 A1 Dec. 27, 2012

(30) Foreign Application Priority Data

Jun. 24, 2011 (KR) .................. 10-2011-0061842

(51) Int. Cl.
*G02B 27/26* (2006.01)
(52) U.S. Cl.
USPC ............................. 359/465; 313/112; 438/43
(58) Field of Classification Search
USPC ............................. 359/465; 313/112; 438/43
See application file for complete search history.

(56) References Cited

U.S. PATENT DOCUMENTS

| | | | | |
|---|---|---|---|---|
| 2005/0168815 A1* | 8/2005 | Maruyama et al. | ........... | 359/465 |
| 2005/0168816 A1* | 8/2005 | Fukaishi et al. | ........... | 359/465 |
| 2008/0239484 A1* | 10/2008 | Fukaishi et al. | ........... | 359/465 |
| 2008/0297897 A1* | 12/2008 | Oyamada et al. | ........... | 359/465 |
| 2011/0216177 A1* | 9/2011 | Chae et al. | ........... | 348/57 |
| 2012/0002123 A1* | 1/2012 | Kang | ........... | 349/15 |
| 2012/0007858 A1* | 1/2012 | Baek | ........... | 345/419 |
| 2012/0013614 A1* | 1/2012 | Matsuhiro et al. | ........... | 345/419 |
| 2012/0032949 A1* | 2/2012 | Lim et al. | ........... | 345/419 |
| 2012/0147001 A1* | 6/2012 | Cho et al. | ........... | 345/419 |
| 2012/0147138 A1* | 6/2012 | Yu | ........... | 348/43 |
| 2012/0147161 A1* | 6/2012 | Kim | ........... | 348/58 |

* cited by examiner

*Primary Examiner* — Mary Ellen Bowman
(74) *Attorney, Agent, or Firm* — Morgan, Lewis & Bockius LLP

(57) ABSTRACT

Embodiments of the invention relate to a stereoscopic image display device using a pattern retarder method, which can widen a vertical viewing angle when watching a stereoscopic image, and a method for fabricating the same. The stereoscopic image display device comprises: a display panel having data lines, gate lines crossing the data lines, and a plurality of pixels formed in cell areas defined by the crossings of the data lines and the gate lines; and a pattern retarder having a first retarder for passing only left circularly polarized light therethrough and a second retarder for passing only right circularly polarized light therethrough, wherein a plurality of light absorption patterns are formed in a first substrate of the display panel, and the long axis direction of the light absorption patterns is the same as the long axis direction of the first retarder and the second retarder.

23 Claims, 22 Drawing Sheets

STEREOSCOPIC IMAGE DISPLAY DEVICE USING PATTERN RETARDER METHOD AND METHOD FOR FABRICATING THE SAME

This application claims the benefit of Korea Patent Application No. 10-2011-0061842 filed on Jun. 24, 2011, the entire contents of which is incorporated herein by reference for all purposes as if fully set forth herein.

BACKGROUND

1. Field

Embodiments of the invention relate to a stereoscopic image display device using a pattern retarder method, vertical viewing angle and a method for fabricating the same.

2. Related Art

A stereoscopic image display device displays a stereoscopic image by using a stereoscopic technique or an autostereoscopic technique. The stereoscopic technique, which uses a binocular parallax image between left and right eyes of a user, includes a glass method and a non-glass method. The glass method is divided into a pattern retarder method and a shutter glass method. In the pattern retarder method the binocular parallax image is displayed on a direct view-based display device or a projector by changing a polarization direction and polarization glasses are used to implement stereoscopic images. In the shutter glass method the binocular parallax image is displayed on a direct view-based display device or a projector in a time-division manner and liquid crystal shutter glasses are used to implement stereoscopic images. In the non-glass method, an optical plate such as a parallax barrier or a lenticular lens for separating an optical axis of the binocular parallax image is used to implement stereoscopic images.

FIG. 1 is a view showing a stereoscopic image display device using a pattern retarder method. Referring to FIG. 1, a liquid crystal display for implementing stereoscopic images in a pattern retarder method implements a stereoscopic image by using polarization characteristics of a pattern retarder PR disposed on a display panel DIS and polarization characteristics of a polarization glasses PG worn by a user. In the stereoscopic image display device using a pattern retarder method displays a left-eye image is displayed on odd lines of the display panel DIS and displays a right-eye image is displayed on even lines. The left-eye image of the display panel DIS is converted into a left circularly polarized light after passing through the pattern retarder PR, and the right-eye image is converted into a right circularly polarized light after passing through the pattern retarder PR. As such, the user sees only the left-eye image with his or her left eye and only the right-eye image with his or her right eye.

To view an optimized stereoscopic image on the stereoscopic image display device using a pattern retarder method, the left-eye image on the odd lines P1 have to pass through a left circular polarization retarder PRL, and the right-eye image on the even lines P2 have to pass through a right circular polarization retarder PRR. However, part of the light of the left-eye image on the odd lines P1 may proceed to the right circular polarization retarder PRR, and part of the right-eye image on the even lines P2 may proceed to the left circular polarization retarder PRL. In this case, at an angle greater than a predetermined vertical viewing angle, the user sees both of the left-eye image and the right-eye image through a left circular polarization filter of polarization glasses PG, and sees both of the left-eye image and the right-eye image through a right-eye polarization filter thereof. Due to this, the user is bound to feel 3D crosstalk by which the left-eye image and the right-eye image are seen to overlap each other. Therefore, the stereoscopic image display device using a pattern retarder method has the problem that a vertical viewing angle for viewing a stereoscopic image without 3D crosstalk is narrow.

SUMMARY

The present invention relates to a stereoscopic image display device using a pattern retarder method and a method for fabricating the same. One object of the present invention is to provide a stereoscopic image display device using a pattern retarder method and a method for fabricating the same which offers an increased vertical viewing angle.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

An aspect of the invention is to provide a stereoscopic image display device comprising: a display panel having data lines, gate lines crossing the data lines, and a plurality of pixels formed in cell areas defined by the crossings of the data lines and the gate lines; and a pattern retarder having a first retarder for passing only left circularly polarized light therethrough and a second retarder for passing only right circularly polarized light therethrough, wherein a plurality of light absorption patterns are formed in a first substrate of the display panel, and the long axis direction of the light absorption patterns is the same as the long axis direction of the first retarder and the second retarder.

Another aspect of the invention is to provide a method for fabricating a stereoscopic image display device, the stereoscopic image display device comprising: a display panel having data lines, gate lines crossing the data lines, and a plurality of pixels formed in cell areas defined by the crossings of the data lines and the gate lines; and a pattern retarder having a first retarder for passing only left circularly polarized light therethrough and a second retarder for passing only right circularly polarized light therethrough, the method comprising: forming a plurality of holes in a first substrate of the display panel; forming a light absorption pattern in the holes; attaching a polarizing plate on the first substrate; and attaching the pattern retarder onto the polarizing plate, wherein, in the forming of a light absorption pattern in the holes, the light absorption pattern is formed such that the long axis direction of the light absorption patterns is the same as the long axis direction of the first retarder and the second retarder.

Another aspect of the invention is to provide a stereoscopic image display device comprising: a display panel having data lines, gate lines crossing the data lines, and a plurality of pixels formed in cell areas defined by the crossings of the data lines and the gate lines; a pattern retarder having a first retarder for passing only left circularly polarized light therethrough and a second retarder for passing only right circularly polarized light therethrough; and a light absorption film attached between the first substrate of the display panel and the pattern retarder, and including a light absorption pattern for absorbing light from the display panel, wherein the long axis direction of the light absorption patterns is the same as the long axis direction of the first retarder and the second retarder.

Another aspect of the invention is to provide a method for fabricating a stereoscopic image display device, the stereoscopic image display device comprising: a display panel having data lines, gate lines crossing the data lines, and a plurality of pixels formed in cell areas defined by the crossings of the data lines and the gate lines; a pattern retarder having a first retarder for passing only left circularly polarized light therethrough and a second retarder for passing only right circularly polarized light therethrough; and a light absorption film attached between the first substrate of the display panel and the pattern retarder, and including a light absorption pattern for absorbing light from the display panel, the method comprising: preparing the light absorption film; attaching the light absorption film to the first substrate of the display panel; attaching a polarizing plate on the light absorption film; and attaching the pattern retarder onto the polarizing plate, wherein, in the preparing of the light absorption film, the light absorption pattern is formed such that the long axis direction of the light absorption patterns is the same as the long axis direction of the first retarder and the second retarder.

BRIEF DESCRIPTION OF THE DRAWINGS

The implementation of the invention will be described in detail with reference to the following drawings in which like numerals refer to like elements.

FIGS. 11a to 11d are cross-sectional views showing a method for fabricating a light absorption film including the light absorption pattern of FIG. 10a;

DETAILED DESCRIPTION

Figure 1:
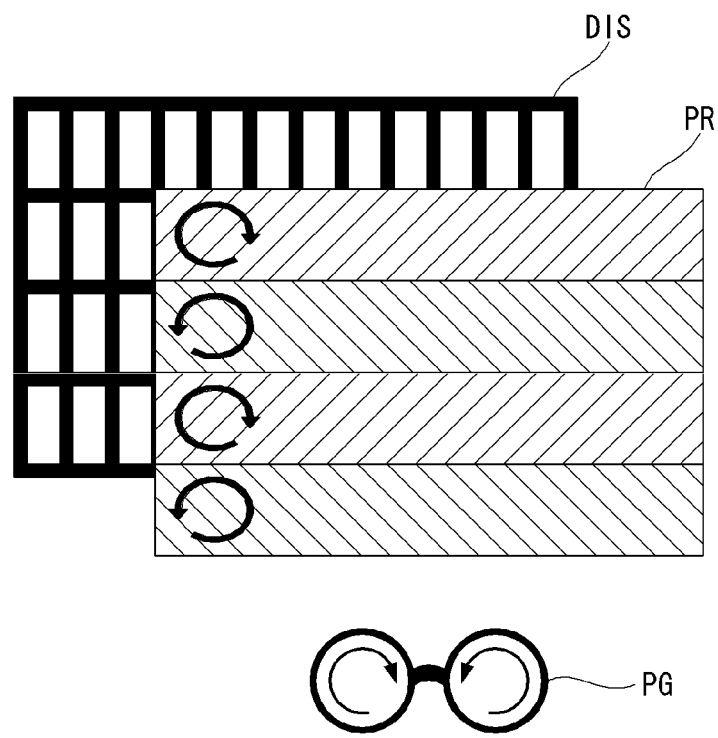
FIG. 1 is a view showing a stereoscopic image display device using a pattern retarder method.

In the following, exemplary embodiments of the present invention will be set forth in detail with reference to the accompanying drawings. Throughout the specification, like reference numerals denote like components. In the following description, well known functions or configurations are not described in detail so as not to obscure the invention in unnecessary detail. Names of elements used in the following description are selected in consideration of facility of specification preparation. Thus, the names of the elements may be different from names of elements used in a real product.

Figure 2:
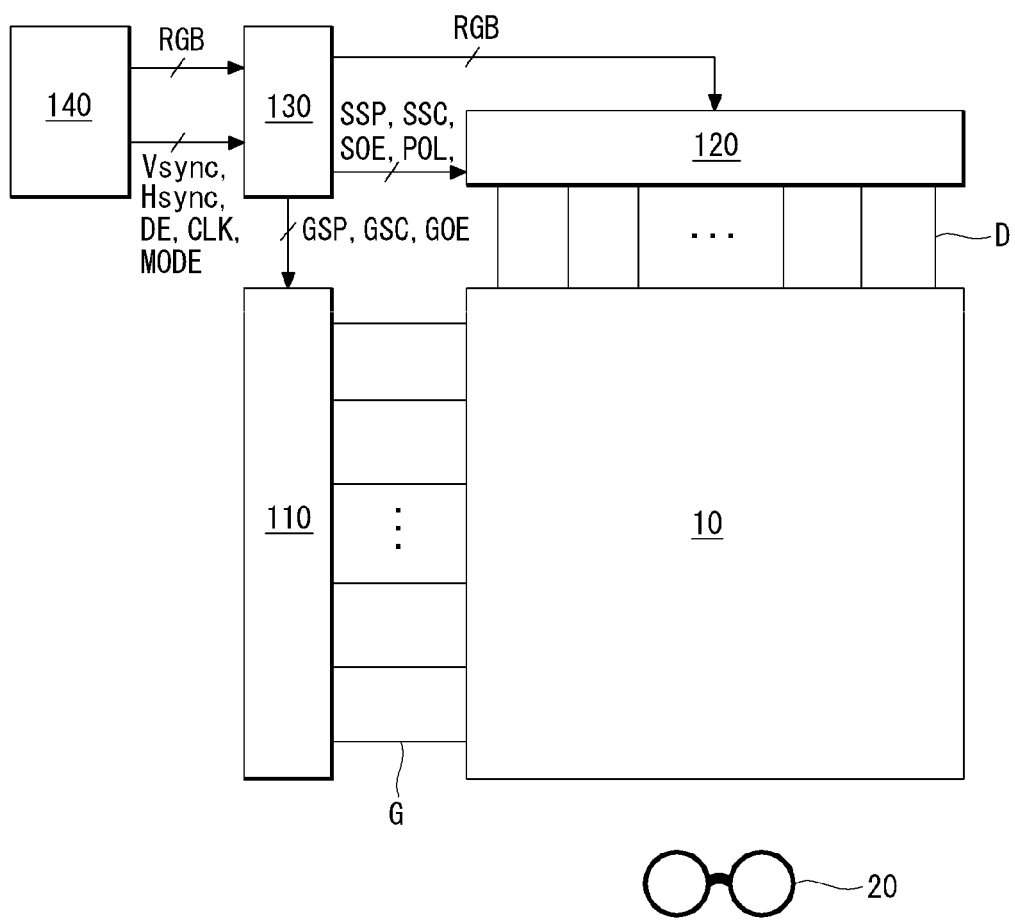
FIG. 2 is a block diagram schematically showing a stereoscopic image display device according to an exemplary embodiment of the present invention.
Figure 3:
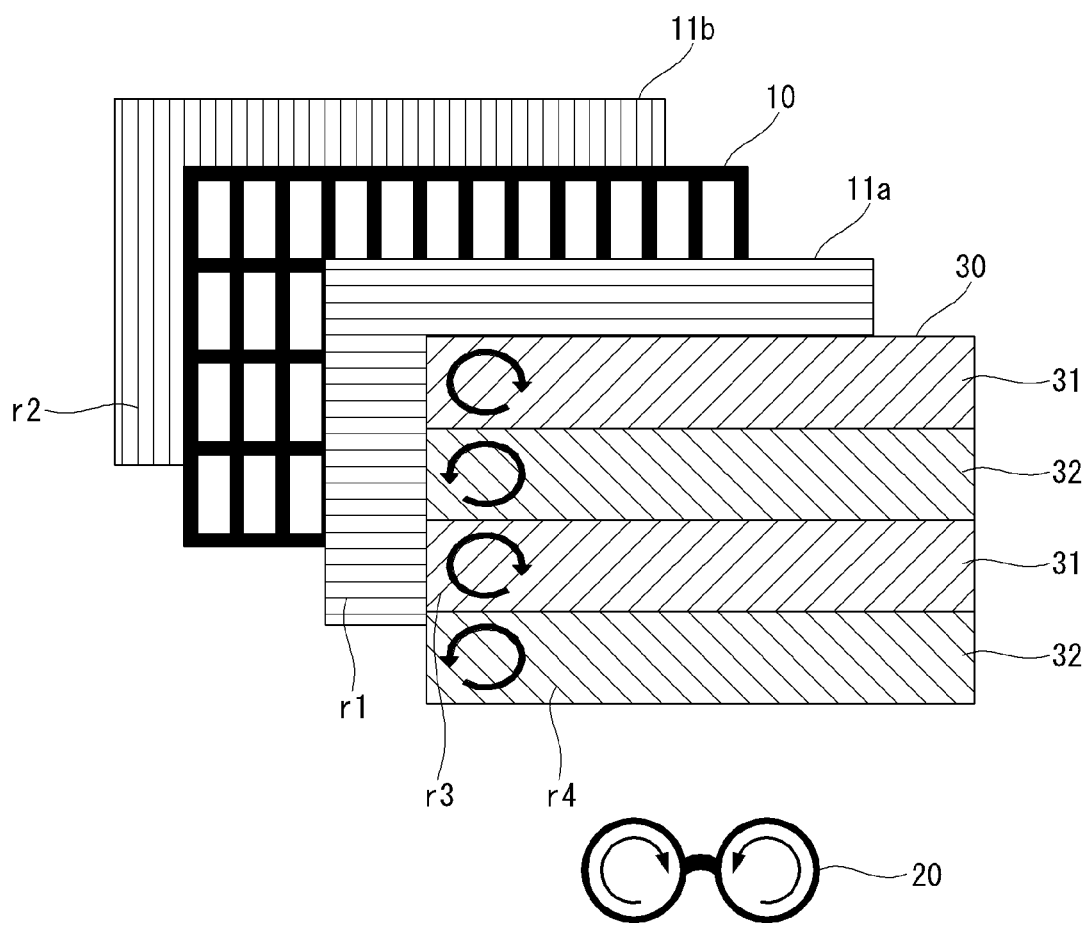
FIG. 3 is an exploded perspective view showing a display panel, a pattern retarder, and polarization glasses.

FIG. 2 is a block diagram schematically showing a stereoscopic image display device according to an exemplary embodiment of the present invention. FIG. 3 is an exploded perspective view showing a display panel, a pattern retarder, and polarization glasses. Referring to FIGS. 2 and 3, the stereoscopic image display device of the present invention comprises a display panel 10, polarization glasses 20, a gate driving unit 120, a timing controller 130, and a host system 140. The stereoscopic image display device of the present invention may be implemented as a flat panel display device such as a liquid crystal display (LCD), a field emission display (FED), a plasma display panel (PDP), and an organic light emitting diode (OLED). In the following, it is to be noted that the stereoscopic image display device of the present invention is illustrated as being implemented as a liquid crystal display device, but the present invention is not limited thereto.

The display panel 10 displays an image under the control of the timing controller 130. The display panel 10 has a liquid crystal layer formed between two substrates. The substrates of the display panel 10 may be implemented as glass, plastic, or a film. If the substrates of the display panel 10 are implemented as plastic, the substrates of the display panel 10 may be made of polycarbonate (PC), polyethylene terephthalate (PET), or polymethyl methacrylate (PMMA).

A color filter array comprising a black matrix, a color filter, and a common electrode is formed on the first substrate of the display panel 10. Moreover, a light absorption pattern may be formed on the first substrate of the display panel 10, and a light absorption film including a light absorption pattern may be attached on the first substrate of the display panel 10. A detailed description of the first substrate of the display panel 10 will be described with reference to FIGS. 4 and 9.

Data lines D and gate lines G (or scan lines) are formed to cross each other on the second substrate of the display panel 10. A thin film transistor (hereinafter, referred to as "TFT") array including pixels disposed in a matrix pattern is formed in cell areas defined by the data lines D and the gate lines G. The pixels of the display panel 10 are respectively connected to the TFTs and driven by an electric field between pixel electrodes and a common electrode. The common electrode is formed on the first substrate in a vertical electric filed type driving configuration such as a twisted nematic (TN) mode and a vertical alignment (VA) mode. Alternatively, the common electrode may be formed on the second substrate together with the pixel electrode in a horizontal electric field type driving configuration such as an in-plane switching (IPS) mode and a fringe field switch (FFS) mode. The display panel 10 may be implemented in any other liquid crystal mode, as well as the TN mode, VA mode, IPS mode, and FFS mode.

The display panel 10 may be selected as a transmissive liquid crystal display panel for modulating light from a backlight unit. The backlight unit comprises light sources that are switched on according to a driving current supplied from the backlight unit driving unit, a light guide plate (or diffusing plate), and a plurality of optical sheets. The backlight unit may be implemented using a direct type backlight unit or an edge type backlight unit. The light sources of the backlight unit may be implemented by one or two types of light sources among a hot cathode fluorescent lamp (HCFL), a cold cathode fluorescent lamp (CCFL), an external electrode fluorescent lamp (EEFL), and a light emitting diode (LED).

Referring to FIG. 3, an upper polarizing plate 11a is attached to the first substrate of the display panel, and a lower polarizing plate 11b is attached to the second substrate. The optical transmission axis r1 of the upper polarizing plate 11a and the optical transmission axis r2 of the lower polarizing plate 11b meet at right angles. Moreover, alignment films for setting a pre-tilt angle of the liquid crystal are formed on the first substrate and the second substrate. Spacers for maintaining a cell gap of the liquid crystal layer are formed between the first substrate and second substrate of the display panel 10.

In the 2D mode, the pixels of the odd lines of the display panel 10 and the pixels of the even lines thereof display a 2D image. In the 3D mode, the pixels of the odd lines of the display panel 10 display a left-eye image (or right-eye image), and the pixels of the odd lines thereof display a right-eye image (or left-eye image). Light of the image displayed in the pixels of the display panel 10 is incident onto the pattern retarder 30 disposed on the display panel 10 through an upper polarization film.

A first retarder 31 is formed on the odd lines of the pattern retarder 30, and a second retarder 32 is formed on the even lines thereof. The pixels of the odd lines of the display panel 10 face the first retarder 31 formed on the odd lines of the pattern retarder 30, and the pixels of the even lines of the display panel 10 face the second retarder 32 formed on the even lines of the pattern retarder 30.

The first retarder 31 delays the phase of the light from the display panel 10 by $+\lambda/4$ ($\lambda$ is the wavelength of light). The second retarder 32 delays the phase of the light from the display panel 10 by $-\lambda/4$. The optic axis r3 of the first retarder 31 and the optic axis r4 of the second retarder 32 meet at right angles. The first retarder 31 of the pattern retarder 30 may be implemented to allow first circularly polarized light (left circularly polarized light) to pass therethrough. The second retarder 32 of the pattern retarder 30 may be implemented to allow second circularly polarized light (right circularly polarized light) to pass therethrough.

The left-eye polarization filter of the polarization glasses 20 has the same optic axis as the first retarder 31 of the pattern retarder 30. The right-eye polarization filter of the polarization glasses 20 has the same optic axis as the second retarder 32. For example, the left-eye polarization filter of the polarization glasses 20 may be selected as a left circular polarization filter, and the right-eye polarization filter of the polarization glasses 20 may be selected as a right circular polarization filter.

Consequently, in the stereoscopic image display device using a pattern retarder method, the left-eye image displayed in the pixels of the odd lines of the display panel 10 passes through the first retarder 31 and is converted into first circularly polarized light, and the right-eye image displayed in the pixels of the even lines passes through the second retarder 32 and is converted into second circularly polarized light. The first circularly polarized light passes through the left-eye polarization filter of the polarization glasses 20 and reaches the left-eye of the user, and the second circularly polarized light passes through the right-eye polarization filter of the polarization glasses 20 and reaches the right-eye of the user. As such, the user sees only the left-eye image with his or her left eye and only the right-eye image with his or her right eye.

The data driving unit 120 comprises a plurality of source drive ICs. The source drive ICs convert digital image data RGB input from the timing controller 130 into positive/negative gamma compensation voltage to generate positive/negative analog data voltages. The positive/negative analog data voltages output from the source drive ICs are supplied to the data lines D of the display panel 10.

The gate driving unit 110 sequentially supplies gate pulses synchronized with data voltages to the gate lines G of the display panel 10 under control of the timing controller 130. The gate driving unit 110 comprises a shift register for sequentially shifting and outputting a gate start pulse GSP supplied from the timing controller 140 according to a gate shift clock GSC, a level shifter for converting an output of the shift register into a swing width suitable for driving the thin film transistor of a pixel, and an output buffer. The gate driving unit 110 may be attached to the display panel 10 in a tape automated bonding (TAB) method, or may be formed on the lower substrate of the display panel 10 in a gate drive IC in panel (GIP) method. In the GIP method, the level shifter may be mounted on a printed circuit board (PCB), and the shift register may be formed on the lower substrate of the display panel 10.

The timing controller 130 generates a gate driving unit control signal and outputs it to the gate driving unit 110 based on digital image data RGB, timing signals Vsync, Hsync, DE, and CLK, and a mode signal MODE from the host system 140, and generates a data driving unit control signal and outputs it to the data driving unit 120. The gate driving unit control signal comprises a gate start pulse, a gate shift clock, and a gate output enable signal. The gate start pulse controls the timing of the first gate pulse. The gate shift clock is a clock signal for shifting the gate start pulse. The gate output enable signal controls the output timing of the gate driving unit 110.

The data driving unit control signal comprises a source start pulse, a source sampling clock, a source output enable signal, and a polarity control signal. The source start pulse controls the data sampling start point of the data driving unit 120. The source sampling clock is a clock signal for controlling the sampling operation of the data driving unit 120 based on a rising or falling edge. When digital video data to be input into the data driving unit 120 is transmitted in a low voltage differential signaling (LVDS) interface specification, the source start pulse and the source sampling clock may be omitted. The polarity control signal inverts the polarity L (L is a natural number) of a data voltage output from the data driving unit 120 every horizontal period. The source output enable signal controls the output timing of the data driving unit 120.

The host system 140 supplies digital image data RGB to the timing controller 130 via an interface such as LVDS (Low Voltage Differential Signaling) interface or TMDS (Transition Minimized Differential Signaling) interface. Moreover, the host system 140 supplies timing signals Vsync, Hsync, DE, and CLK, a mode signal MODE, etc. to the timing controller 130.

Figure 4:
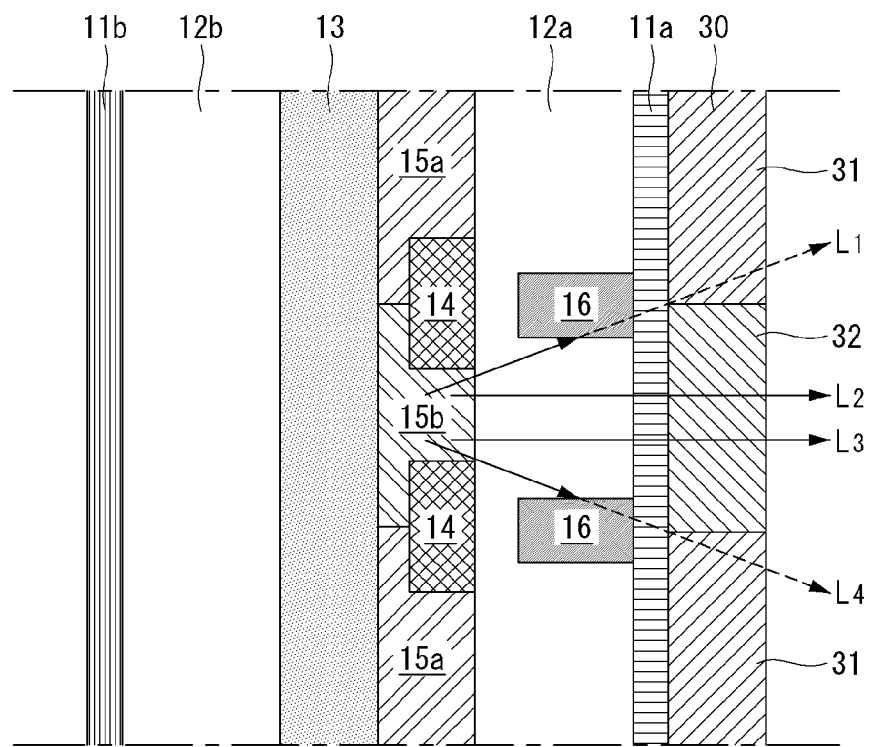
FIG. 4 is a cross-sectional view showing in detail a display panel with a light absorption pattern, polarizing plates, and a pattern retarder according to a first exemplary embodiment of the present invention.

FIG. 4 is a cross-sectional view showing in detail a display panel with a light absorption pattern, polarizing plates, and a pattern retarder according to a first exemplary embodiment of the present invention. Referring to FIG. 4, the display panel 10 comprises a first substrate 12a, a second substrate 12b, and a liquid crystal layer 13 formed between the first substrate 12a and the second substrate 12b. Each of the first substrate 12a and the second substrate 12b includes a first plane and a second plane. Light absorption pattern 16 is formed on and the upper polarizing plate 11a is attached to the first plane of the first substrate 12a. Black matrix 14, an odd line color filter 15a, and an even line color filter 15b are formed on the second plane of the first substrate 12a. a TFT array (not shown) is formed on the first plane of the second substrate 12b. The lower polarizing plate 11b is attached to the second plane of the second substrate 12b. The odd line color filter 15a is formed to face the pixels of the odd lines, and the even line color filter 15b is formed to face the pixels of the even lines. The light absorption pattern 16 is formed to face the black matrix 14 formed between the odd line color filter 15a and the even line color filter 15b.

The light emitted from the odd line color filter 15b may be divided into first light L1 and fourth light L4 traveling to a first retarder 31 disposed on an odd line and second light L2 and third light L3 traveling to a second retarder 32 disposed on an even line depending on the degree of light emission. The second light L2 and the third light L3 pass through the second retarder 32 and are converted into right circularly polarized light, and travels to the right eye of the user. The first light L1 and the fourth light L4 pass through the first retarder 31 and are converted into left circularly polarized light, and travels to the left eye of the user. Therefore, if the light absorption pattern 16 does not exist, the user feels 3D crosstalk by which the left-eye image and the right-eye image overlap with each other even at an angle greater than a predetermined vertical viewing angle. However, if the light absorption pattern 16 exists, the first light L1 and fourth light L4 emitted from the odd line color filter 15b are absorbed by the light absorption pattern 16. Accordingly, the first light L1 and the fourth light L4 do not travel to the left eye of the user any more, and the user does not feel 3D crosstalk even at an angle greater than a predetermined vertical viewing angle. That is, the present invention has the advantage that the vertical viewing angle can be widened by using the light absorption pattern 16.

Figure 5:
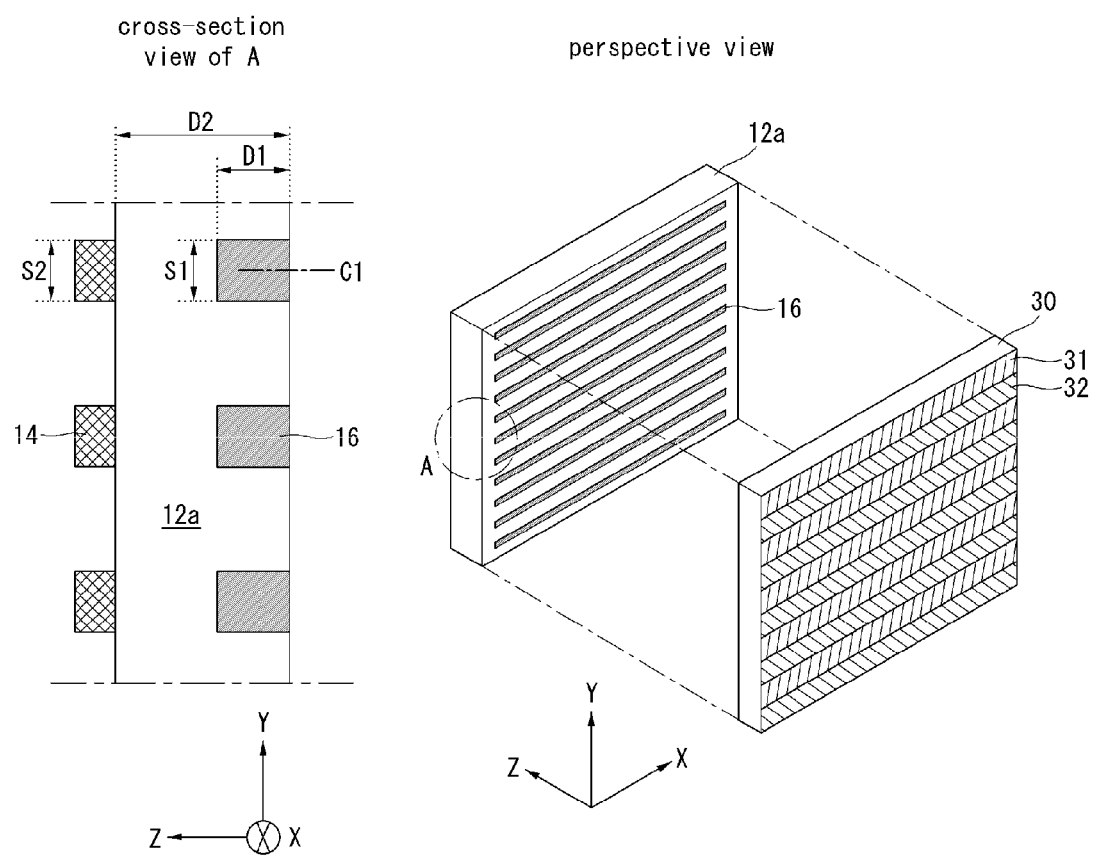
FIG. 5 is a perspective view and a cross-sectional view showing in detail the first substrate and pattern retarder of FIG. 4.

FIG. 5 is a cross-sectional view showing in detail the first substrate and pattern retarder of FIG. 4. Referring to FIG. 5, the long axis (x-axis) direction of the light absorption pattern 16 formed on the first substrate 12a of the display panel 10 is equal to the long axis (x-axis) direction of the first retarder 31 and second retarder 32 of the pattern retarder 30. The short axis (y-axis) direction of the light absorption pattern 16 is equal to the short axis (y-axis) of the first retarder 31 and second retarder 32.

The light absorption pattern 16 is formed to face the black matrix 14. The black matrix 14 is formed between the pixels of the odd lines of the display panel 10 and the pixels of the even lines thereof. As shown in FIG. 4, the pixels of the odd lines face the odd line color filter 15a, and the pixels of the even lines face the even line color filter 15b. Thus, the black matrix 14 is formed between the odd line color filter 15a and the even line color filter 15b.

The length s1 of the short axis (y-axis) direction of the light absorption pattern 16 is preferably 0.1 to 1.1 times greater than the length s2 of the short axis (y-axis) direction of the black matrix 14. If the short axis (y-axis) direction of the light absorption pattern 16 is less than 0.1 times the length s2 of the short axis (y-axis) direction of the black matrix 14, it cannot play the role of the light absorption pattern 16. If the length s1 of the long axis (x-axis) direction of the light absorption pattern 16 is greater than 1.1 times the length s2 of the short axis (y-axis) direction of the black matrix 14, there may rise the problem of luminance degradation.

Moreover, the center c1 of the short axis (y-axis) direction of the light absorption pattern 16 is positioned within the length s2 of the short axis (y-axis) direction of the black matrix 14. If the center c1 of the short axis (y-axis) direction of the light absorption pattern 16 is positioned beyond the length s2 of the short axis (y-axis) of the black matrix 14, the light absorption pattern 16 faces not the black matrix 14 but the portion emitted from the odd and even line color filters 15a and 15b. This may cause luminance degradation and fail to improve the vertical viewing angle.

Figure 6:
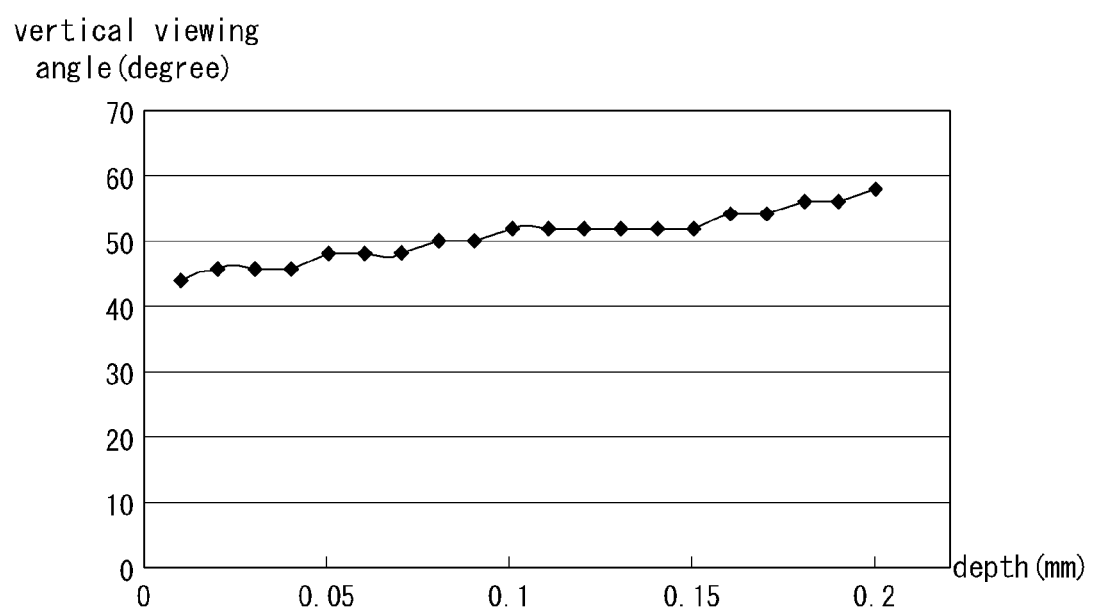
FIG. 6 is a graph showing a vertical viewing angle varying with the depth of the light absorption pattern of FIG. 4.

Preferably, the depth D1 of the light absorption pattern 16 is 0.0001 times greater than the thickness D2 of the first substrate 12a, and is less than the thickness D2 of the first substrate 12a. As shown in FIG. 6, the greater the depth D1 of the light absorption pattern 16, the wider the vertical viewing angle. Referring to FIG. 6, when the thickness of the first substrate 12a is 0.7 mm and the depth D1 of the light absorption pattern 16 is 0.01 mm, the vertical viewing angle is approximately 44°. If the depth D1 of the light absorption pattern 16 is 0.2 mm, the vertical viewing angle is approximately 58°.

The length s1 of the short axis (y-axis) direction of the light absorption pattern 16, the position of the center c1 of the length of the short axis (y-axis) direction of the light absorption pattern 16, the depth D1 of the light absorption pattern 16 may be varied according to how the vertical viewing angle is to be widened and according to the size of the pixels of the display panel 10. For example, the greater the depth D1 of the light absorption pattern 16, the wider the vertical viewing angle, and the larger the size of the pixels of the display panel 10, the greater the length s1 of the short-axis (y-axis) direction of the light absorption pattern 16. The length s1 of the short axis (y-axis) direction of the light absorption pattern 16, the position of the center c1 of the length of the short axis (y-axis) direction of the light absorption pattern 16, the depth D1 of the light absorption pattern 16 can be optimally determined by a pre-test before commercialization of the stereoscopic image display device.

Figure 7:
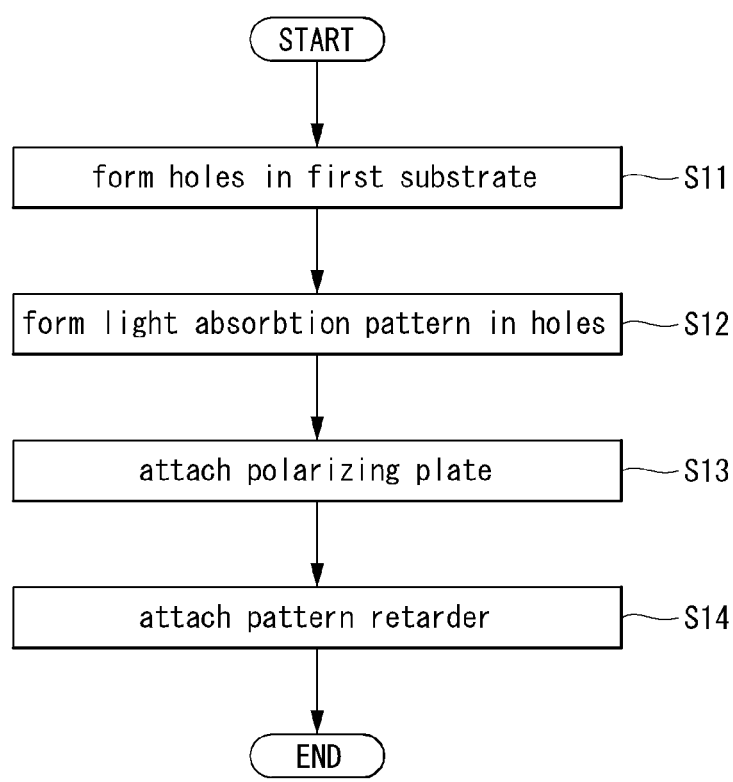
FIG. 7 is a flowchart showing a method for fabricating a stereoscopic image display device including a light absorption pattern according to the first exemplary embodiment of the present invention.
Figure 8A:
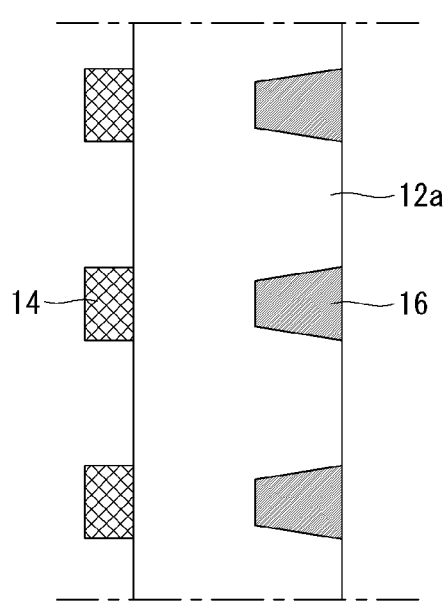
FIGS. 8a to 8c are views showing in detail exemplary embodiment of the light absorption pattern of FIG. 4.
Figure 8B:
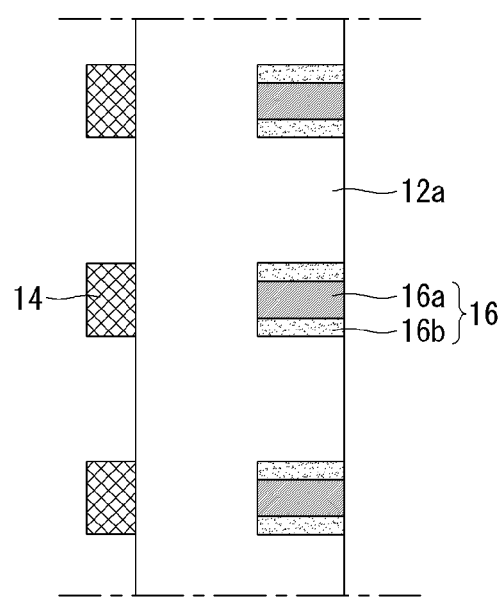
Figure 8C:
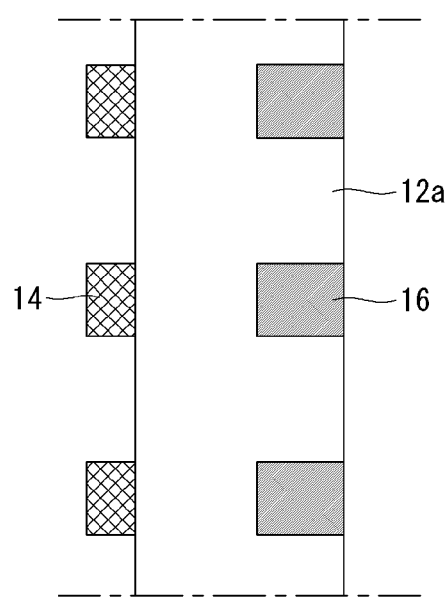

FIG. 7 is a flowchart showing a method for fabricating a stereoscopic image display device device including a light absorption pattern according to the first exemplary embodiment of the present invention. FIGS. 8a to 8c are views showing in detail exemplary embodiment of the light absorption pattern.

Hereinafter, the method for fabricating a stereoscopic image display device according to the second exemplary embodiment of the present invention will be described in detail with reference to FIGS. 7 to 8c.

First, a plurality of holes are formed on the first substrate 12a of the display panel 10. The holes are formed on the first plane of the first substrate 12a to which the first polarizing plate 11a and the pattern retarder 30 are attached. In this case, the holes may be formed by scribing using an infrared ray laser, or scribing using a diamond bite. Alternatively, the holes may be formed by using mechanical processing using a programmable logic controller, a molding process using a mold, and an etching process using a photoresist pattern. The etching process comprises a dry etching process and a wet etching process. Further, the holes may be formed on the first substrate 12a simultaneously with the fabrication of the first substrate 12a. In this case, the holes may be formed on the first substrate 12a using an extrusion molding method. The holes may be formed by pressing a mold patterned with the holes onto the melted first substrate 12a and cooling it (S11).

Second, once the holes are formed on the first substrate 12a, a light absorbing material is filled in the holes to form the light absorption pattern 16. The long axis (x-axis) direction of the light absorption pattern 16 is identical to the long axis (x-axis) direction of the first retarder 31 and second retarder 32 of the pattern retarder 30. The light absorption pattern 16 is formed to face the black matrix 14 formed between the pixels of the odd lines and the pixels of the even lines. The short-axis (y-axis) direction length s2 and depth D1 of the light absorption pattern 16 may be varied according to how the vertical viewing angle is to be widened and according to the size of the pixels of the display panel 10.

Referring to FIGS. 8a to 8c, the light absorption pattern 16 may have a light absorbing material filled in a trapezoidal shape as shown in FIG. 8a and in a rectangular shape as shown in FIGS. 8b and 8c. The light absorption pattern 16 may be formed by patterning chrome Cr, a chrome oxide film CrOx, or carbon in the holes formed in the first substrate 12a. At this point, the chrome (Cr), chrome oxide film (CrOx), or carbon is patterned by sputtering or metal deposition.

Moreover, as shown in FIG. 8b, the light absorption pattern 16 may comprise a light blocking film 16a and an adhesive 16b for adhering the light blocking film 16a to the holes. The light absorption pattern 16 may be formed by adhering the light blocking film 16a to the holes formed in the first substrate 12a.

Further, as shown in FIG. 8c, the light absorption pattern 16 may be formed by coating black ink in the holes formed in the first substrate 12a. At this point, the black ink may be filled in the holes by an inkjet method (S12).

Third, the first polarizing plate 11a is attached to the first plane of the first substrate 12a on which the light absorption pattern 16 is formed. The optical axis of the first polarizing plate 11a is perpendicular to the optical axis of the second polarizing plate 11b attached to the first plane of the second substrate 12b (S13).

Fourth, the pattern retarder 30 is attached on the first polarizing plate 11a. Once the pattern retarder 30 is attached, alignment needs to be done in such a manner that the first retarder 31 is disposed on the pixels of the odd lines, and the second retarder 32 is disposed on the pixels of the even lines (S14).

Figure 9:
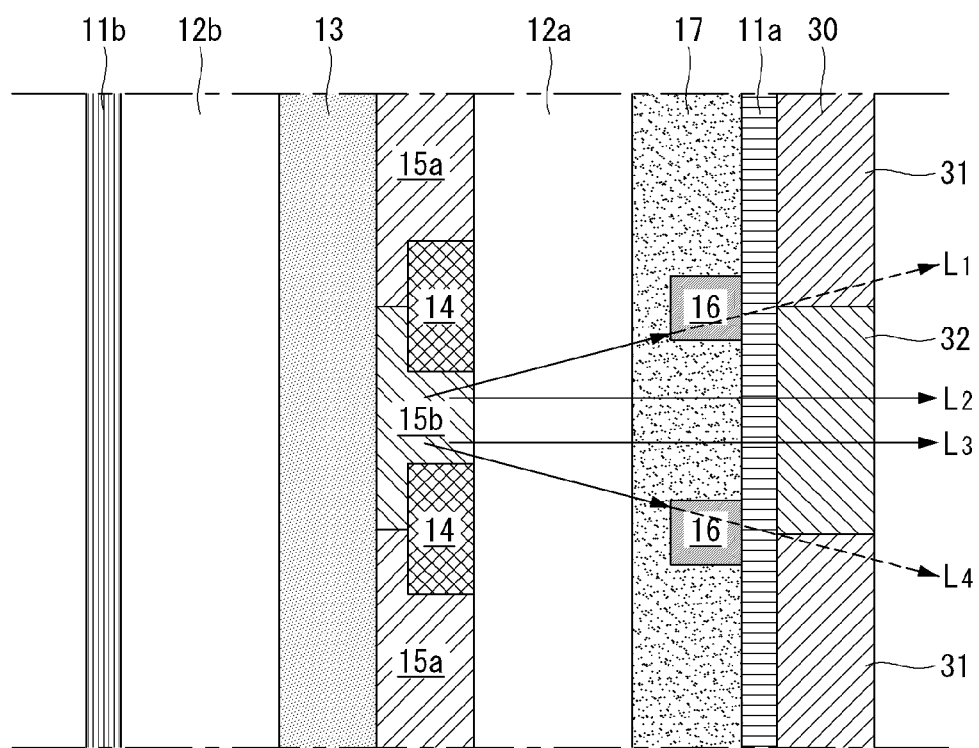
FIG. 9 is a cross-sectional view showing in detail a display panel with a light absorption pattern, polarizing plates, and a pattern retarder according to a second exemplary embodiment of the present invention.

FIG. 9 is a cross-sectional view showing in detail a display panel with a light absorption pattern, polarizing plates, and a pattern retarder according to a second exemplary embodiment of the present invention. Referring to FIG. 4, the display panel 10 comprises a first substrate 12a, a second substrate 12b, and a liquid crystal layer 13 formed between the first substrate 12a and the second substrate 12b. Each of the first substrate 12a and the second substrate 12b includes a first plane and a second plane. Light absorption film 17 including light absorption pattern 16 is attached to the first plane of the first substrate 12a. The upper polarizing plate 11a is attached to light absorption film 17. Black matrix 14, an odd line color filter 15a, and an even line color filter 15b are formed on the second plane of the first substrate 12a. a TFT array (not shown) is formed on the first plane of the second substrate 12b. The lower polarizing plate 11b is attached to the second plane of the second substrate 12b. The odd line color filter 15a is formed to face the pixels of the odd lines, and the even line color filter 15b is formed to face the pixels of the even lines. The light absorption pattern 16 of the light absorption film 17 is formed to face the black matrix 14 formed between the odd line color filter 15a and the even line color filter 15b.

The light emitted from the odd line color filter 15b may be divided into first light L1 and fourth light L4 traveling to a first retarder 31 disposed on an odd line and second light L2 and third light L3 traveling to a second retarder 32 disposed on an even line depending on the degree of light emission. The second light L2 and the third light L3 pass through the second retarder 32 and are converted into right circularly polarized light, and travels to the right eye of the user. The first light L1 and the fourth light L4 pass through the first retarder 31 and are converted into left circularly polarized light, and travels to the left eye of the user. Therefore, if the light absorption pattern 16 does not exist, the user feels 3D crosstalk by which the left-eye image and the right-eye image overlap with each other even at an angle greater than a predetermined vertical viewing angle. However, if the light absorption pattern 16 exists, the first light L1 and fourth light L4 emitted from the odd line color filter 15b are absorbed by the light absorption pattern 16. Accordingly, the first light L1 and the fourth light L4 do not travel to the left eye of the user any more, and the user does not feel 3D crosstalk even at an angle greater than a predetermined vertical viewing angle. That is, the present invention has the advantage that the vertical viewing angle can be widened by using the light absorption pattern 16.

Additionally, the light absorption pattern 16 of the light absorption film 17 according to the second exemplary embodiment of the present invention is similar to the light absorption pattern 16 according to the first exemplary embodiment of the present invention described with reference to FIG. 5. The long axis (x-axis) direction of the light absorption pattern 16 of the light absorption film 17 is equal to the long axis (x-axis) direction of the first retarder 31 and second retarder 32 of the pattern retarder 30. The short axis (y-axis) direction of the light absorption pattern 16 of the light absorption film 17 is equal to the short axis (y-axis) of the first retarder 31 and second retarder 32.

The light absorption pattern 16 of the light absorption film 17 is formed to face the black matrix 14. The black matrix 14 is formed between the pixels of the odd lines of the display panel 10 and the pixels of the even lines thereof. That is, the black matrix 14 is formed between the odd line color filter 15a and the even line color filter 15b.

The length s1 of the short axis (y-axis) direction of the light absorption pattern 16 of the light absorption film 17 is preferably 0.1 to 1.1 times greater than the length s2 of the short axis (y-axis) direction of the black matrix 14. Preferably, the center of the short axis direction (y-axis) of the light absorption pattern 16 of the light absorption film 17 is positioned within the length s2 of the short axis (y-axis) direction of the black matrix 14.

The length s1 of the short axis (y-axis) direction of the light absorption pattern 16 and the position of the center of the length of the short axis (y-axis) direction of the light absorption pattern 16 may be varied according to how the vertical viewing angle is to be widened and according to the size of the pixels of the display panel 10. The length s1 of the short axis (y-axis) direction of the light absorption pattern 16 and the position of the center c1 of the length of the short axis (y-axis) direction of the light absorption pattern 16 can be optimally determined by a pre-test before commercialization of the stereoscopic image display device.

Figure 10A:
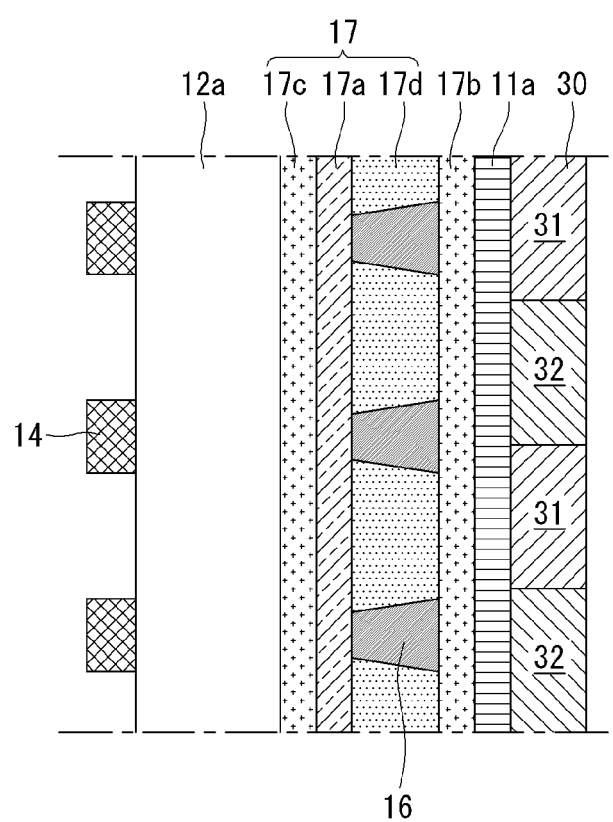
FIGS. 10a and 10b are cross-sectional views showing in detail exemplary embodiments of the light absorption pattern of FIG. 9.
Figure 10B:
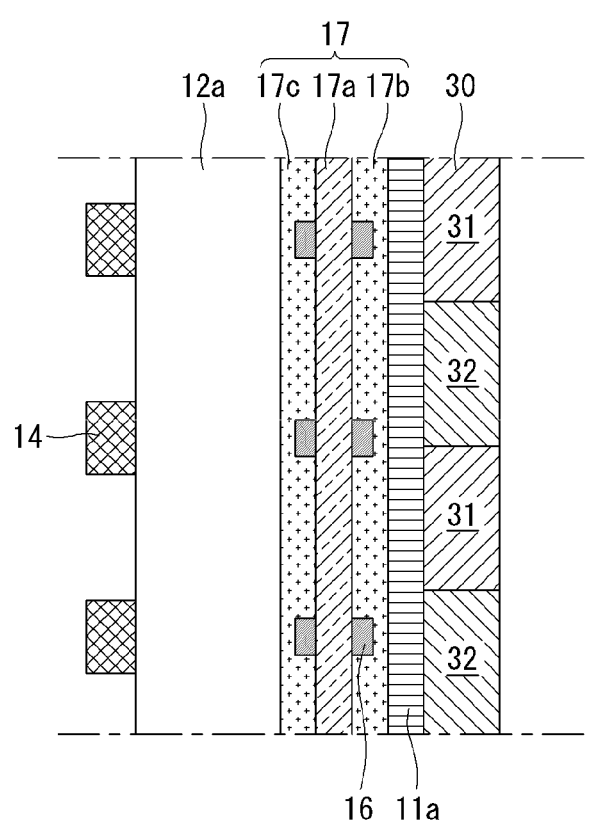

FIGS. 10a and 10b are cross-sectional views showing in detail exemplary embodiments of the light absorption pattern of FIG. 9. Referring to FIG. 10a, the light absorption film 17 is disposed between the first substrate 12a and the upper polarizing plate 11a of the display panel 10. The light absorption film 17 comprises a base film 17a, first and second adhesive layers 17b and 17c, a pattern area 17d, and a light absorption pattern 16.

The base film 17a may be formed of TAC (Triacetyl Cellulose), PET (Poly Ethlylene Terephthalate), PC (Poly Carbonate), PMMA (Polymethyl Metacrylate), PES (Poly Ether Sulfone), etc. The light absorption pattern 16 may be formed on both of the first plane of the base film 17a and the second plane 17b opposed to the first plane. Alternatively, the light absorption pattern 16 may be formed only on the first plane of the base film 17a or only on the second plane thereof. The light absorption pattern 16 formed on the first plane and/or second plane of the base film 17a faces the black matrix 14. As the first and second adhesive layers 17b and 17c, a PSA (pressure sensitive adhesive) film or UV hardening agent can be used as the first and second adhesive layers 17b and 17c. The first adhesive layer 17b adheres the pattern area 17d and the first polarizing plate 11a together. The second adhesive layer 17c adheres the base film 17a and the first substrate 12a together.

FIGS. 11a to 11d are cross-sectional views showing a method for fabricating a light absorption film including the light absorption pattern of FIG. 10a. Hereinafter, the method for fabricating the light absorption film 17 including the light absorption pattern of FIG. 10b with reference to FIGS. 11a to 11d.

Figure 11A:
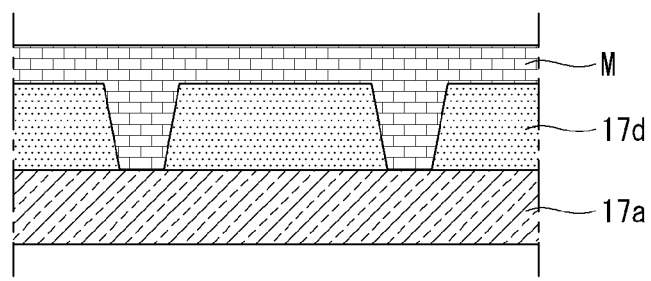
Figure 11B:
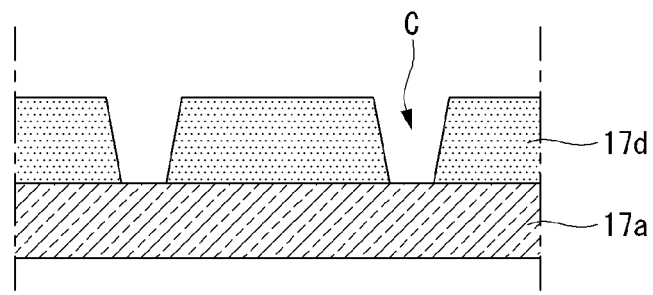

First, a pattern area 17d is formed on the first plane of the base film 17a. To form the pattern area 17d, as shown in FIG. 11a, a mold M is disposed in the light absorption pattern forming area. A UV hardening agent is coated on the first plane of the base film 17a on which the mold M is disposed. After hardening the UV hardening agent by irradiating UV light, the mold M is removed. Finally, as shown in FIG. 11b, the pattern area 17d comprising a concave portion C is formed.

Figure 11C:
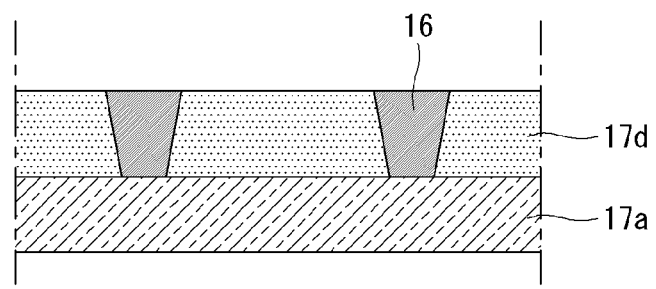

Second, as shown in FIG. 11c, the light absorption pattern 16 is formed in the concave portion C of the pattern area 17d. The light absorption pattern 16 may be formed by coating black ink in the concave portion C. At this point, black ink may be filled in the concave portion C by using an inkjet method. The black ink filled in the concave portion C is hardened by natural hardening, thermal hardening, UV hardening, etc.

Figure 11D:
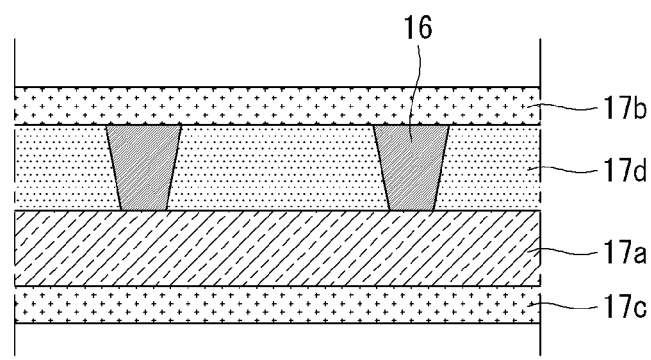

Third, as shown in FIG. 11d, the first adhesive layer 17b is coated on the pattern area 17d, and the second adhesive layer 17c is coated on the second plane of the base film 17a. The first adhesive layer 17b adheres the pattern area 17d and the upper polarizing plate 11a together. The second adhesive layer 17c adheres the base film 17a and the first substrate 12a together.

Figure 12A:
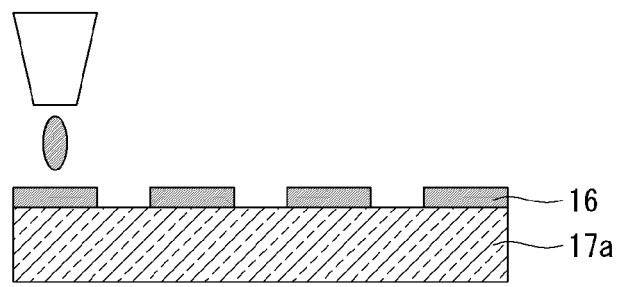
FIGS. 12a to 12d are cross-sectional views showing a method for fabricating a light absorption film including the light absorption pattern of FIG. 10b.
Figure 12B:
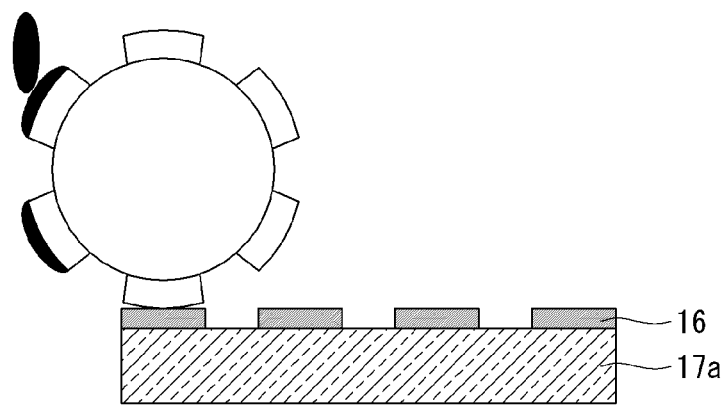
Figure 12C:
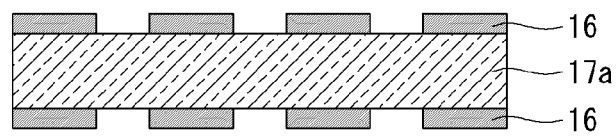

FIGS. 12a to 12c are cross-sectional views showing a method for fabricating a light absorption film including the light absorption pattern of FIG. 10b. Hereinafter, the method for fabricating the light absorption film 17 including the light absorption pattern of FIG. 10b with reference to FIGS. 12a to 12c.

First, the light absorption pattern 16 is formed on the first plane of the base film 17a. The light absorption pattern 16 may be formed by an inkjet method as shown in FIG. 12a, or may be formed by a concave plate printing method or gravure coating method.

Second, as shown in FIG. 12, the light absorption pattern 16 is formed on the second plane of the base film 17a. The light absorption pattern may be formed by an inkjet method, or by a concave plate printing method (or gravure coating method).

Figure 12D:
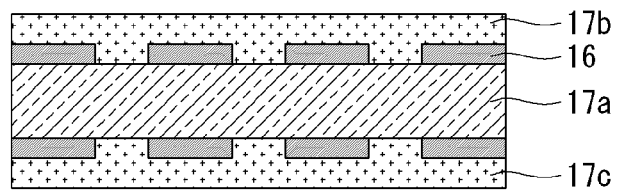

Third, as shown in FIG. 12d, the first adhesive layer 17b is coated on the first plane of the base film 17a, and the second adhesive layer 17c is coated on the first plane of the base film 17a. The first adhesive layer 17b adheres the base film 17a and the upper polarizing plate 11a, and the second adhesive layer 17c adheres the base film 17a and the first substrate 12a.

Meanwhile, the light absorption pattern 16 may be formed only on the first plane of the base film 17a or only on the second plane thereof. If the light absorption pattern 16 is formed only on the first plane of the base film 17a, the process of forming the light absorption pattern 16 on the second plane of the base film 17a is not necessary. Also, if the light absorption pattern 16 is formed on the second plane of the base film 17a, the process of forming the light absorption pattern 16 on the first plane of the base film 17a is not necessary.

Figure 13:
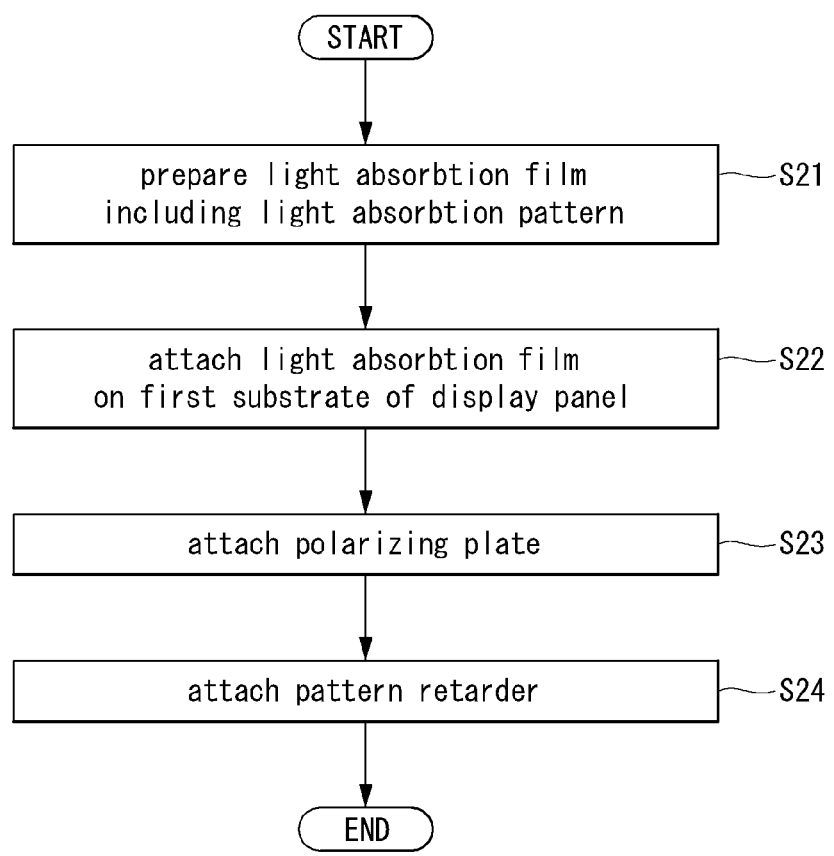
FIG. 13 is a flowchart showing a method for fabricating a stereoscopic image display device according to a second exemplary embodiment of the present invention.

FIG. 13 is a flowchart showing a method for fabricating a stereoscopic image display device according to a second exemplary embodiment of the present invention. Hereinafter, the method for fabricating a stereoscopic image display device according to the second exemplary embodiment of the present invention will be described in detail with reference to FIG. 13.

First, a light absorption film 17 including a light absorption pattern 16 is prepared. The method for fabricating a light absorption film was described in detail before with reference to FIGS. 11a to 11d and FIGS. 12a to 12d (S21).

Second, the light absorption film 17 is attached on the first substrate 12a. The first substrate 12a and the light absorption film 17 are adhered by using a PSA (Pressure Sensitive Adhesive) film or UV hardening agent (S22).

Third, the first polarizing plate 11a is attached on the light absorption film 17. The optical axis of the first polarizing plate 11a is perpendicular to the optical axis of the second polarizing plate 11b of the second polarizing plate 11b attached on the first plane of the second substrate 12b (S23).

Fourth, the pattern retarder 30 is attached on the first polarizing plate 11a. When the pattern retarder 30 is attached, alignment needs to be done in such a manner that the first retarder 31 is disposed on the pixels of the odd lines and the second retarder 32 is disposed on the pixels of the even lines (S24).

As seen from above, the present invention has a light absorption pattern formed on the substrate of the display panel on which the pattern retarder is attached. Due to this, in the present invention, the light absorption pattern can absorb light traveling to the right-eye polarization retarder, among the light of the left-eye image, and the light absorption pattern can absorb the light traveling to the left-eye polarization retarder, among the light of the right-eye image. As a result, the present invention can widen the vertical viewing angle when viewing a stereoscopic image.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
    a display panel having data lines, gate lines crossing the data lines, and a plurality of pixels formed in cell areas defined by the crossings of the data lines and the gate lines; and
    a pattern retarder having a first retarder for passing only left circularly polarized light therethrough and a second retarder for passing only right circularly polarized light therethrough,
    wherein a plurality of light absorption patterns are formed in a first substrate of the display panel, and
    the long axis direction of the light absorption patterns is the same as the long axis direction of the first retarder and the second retarder.

2. The stereoscopic image display device of claim 1, wherein the light absorption pattern faces a black matrix formed between the pixels of the odd lines of the display panel and the pixels of the even lines thereof.

3. The stereoscopic image display device of claim 1, wherein the pixels of the odd lines face the first retarder, and the pixels of the even lines face the second retarder.

4. The stereoscopic image display device of claim 2, wherein the length of the short axis direction of the light absorption pattern is 0.1 to 1.1 times greater than the length of the short axis direction of the black matrix.

5. The stereoscopic image display device of claim 2, wherein the center of the length of the short axis direction of the light absorption pattern is positioned within the length of the short axis direction of the black matrix.

6. The stereoscopic image display device of claim 2, wherein the depth of the light absorption pattern is 0.0001 times greater than the thickness of the first substrate.

7. The stereoscopic image display device of claim 1, wherein a polarizing plate is additionally attached between the first substrate and the pattern retarder.

8. A method for fabricating a stereoscopic image display device, the stereoscopic image display device comprising: a display panel having data lines, gate lines crossing the data lines, and a plurality of pixels formed in cell areas defined by the crossings of the data lines and the gate lines; and a pattern retarder having a first retarder for passing only left circularly polarized light therethrough and a second retarder for passing only right circularly polarized light therethrough, the method comprising:
   forming a plurality of holes in a first substrate of the display panel;
   forming a light absorption pattern in the holes;
   attaching a polarizing plate on the first substrate; and
   attaching the pattern retarder onto the polarizing plate,
   wherein, in the forming of a light absorption pattern in the holes, the light absorption pattern is formed such that the long axis direction of the light absorption patterns is the same as the long axis direction of the first retarder and the second retarder.

9. The method of claim 8, wherein, in the forming of a plurality of holes in the first substrate of the display panel, the holes are formed by scribing using an infrared ray laser, or scribing using a diamond bite.

10. The method of claim 8, wherein, in the forming of a light absorption pattern in the holes, the light absorption pattern is formed such that the light absorption pattern faces the black matrix formed between the pixels of the odd lines of the display panel and the pixels of the even lines thereof.

11. The method of claim 10, wherein, in the forming of a light absorption pattern in the holes, the light absorption pattern is formed by patterning chrome Cr, a chrome oxide film CrOx, or carbon in the holes by sputtering or metal deposition.

12. The method of claim 10, wherein, in the forming of a light absorption pattern in the holes, the light absorption pattern is formed by adhering a light blocking film to the holes by an adhesive.

13. The method of claim 10, wherein, in the forming of a light absorption pattern in the holes, the light absorption pattern is formed by coating black ink in the holes by an inkjet method.

14. A stereoscopic image display device comprising:
   a display panel having data lines, gate lines crossing the data lines, and a plurality of pixels formed in cell areas defined by the crossings of the data lines and the gate lines;
   a pattern retarder having a first retarder for passing only left circularly polarized light therethrough and a second retarder for passing only right circularly polarized light therethrough;
   a light absorption film attached between the first substrate of the display panel and the pattern retarder, and including a light absorption pattern for absorbing light from the display panel,
   wherein the long axis direction of the light absorption patterns is the same as the long axis direction of the first retarder and the second retarder.

15. The stereoscopic image display device of claim 14, wherein the light absorption pattern faces a black matrix formed between the pixels of the odd lines of the display panel and the pixels of the even lines thereof.

16. The stereoscopic image display device of claim 15, wherein the pixels of the odd lines face the first retarder, and the pixels of the even lines face the second retarder.

17. The stereoscopic image display device of claim 15, wherein a polarizing plate is additionally attached between the first substrate and the pattern retarder.

18. The stereoscopic image display device of claim 17, wherein the light absorption film further comprises:
   a base film;
   a pattern area in which a light absorption pattern forming area is formed on a first plane of the base film;
   a first adhesive layer for adhering the pattern area and the polarizing plate together; and
   a second adhesive layer for adhering a second plane opposed to the first plane of the base film to the first substrate of the display panel.

19. The stereoscopic image display device of claim 17, wherein the light absorption film further comprises:
   a base film having the light absorption film formed on a first plane and/or a second plane opposed to the first plane;
   a first adhesive layer for adhering the first plane of the base film and the polarizing plate; and
   a second adhesive layer for adhering the second plane of the base film and the first substrate.

20. A method for fabricating a stereoscopic image display device, the stereoscopic image display device comprising:
   a display panel having data lines, gate lines crossing the data lines, and a plurality of pixels formed in cell areas defined by the crossings of the data lines and the gate lines;
   a pattern retarder having a first retarder for passing only left circularly polarized light therethrough and a second retarder for passing only right circularly polarized light therethrough; and
   a light absorption film attached between the first substrate of the display panel and the pattern retarder, and including a light absorption pattern for absorbing light from the display panel,
   the method comprising:
   preparing the light absorption film;
   attaching the light absorption film to the first substrate of the display panel;
   attaching a polarizing plate on the light absorption film; and
   attaching the pattern retarder onto the polarizing plate,
   wherein, in the preparing of the light absorption film, the light absorption pattern is formed such that the long axis direction of the light absorption patterns is the same as the long axis direction of the first retarder and the second retarder.

21. The method of claim 20, wherein, in the preparing of the light absorption film, the light absorption pattern is formed such that the light absorption pattern faces the black matrix formed between the pixels of the odd lines of the display panel and the pixels of the even lines thereof.

22. The method of claim 21, wherein the preparing of the light absorption film further comprises:
   forming a pattern area comprising a concave portion where the light absorption pattern is formed; and
   forming the light absorption pattern in the concave portion.

23. The method of claim 21, wherein, in the preparing of the light absorption film, the light absorption pattern is formed on the first plane and/or second plane of the base film by an inkjet method or gravure printing method.

* * * * *